(12) United States Patent (10) Patent No.: US 7,869,527 B2
Vetter et al. (45) Date of Patent: Jan. 11, 2011

(54) TRANSCEIVER WITH HYBRID ADAPTIVE SELF-INTERFERENCE CANCELLER FOR REMOVING TRANSMITTER GENERATED NOISE TO PREVENT MODEM JAMMING

(75) Inventors: Kurt G. Vetter, East Quoque, NY (US); Leonid Kazakevich, Plainview, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 650 days.

(21) Appl. No.: 11/872,101

(22) Filed: Oct. 15, 2007

(65) Prior Publication Data

US 2008/0089397 A1 Apr. 17, 2008

Related U.S. Application Data

(60) Provisional application No. 60/829,765, filed on Oct. 17, 2006.

(51) Int. Cl.
*H04L 27/00* (2006.01)
(52) U.S. Cl. ...................................... 375/259
(58) Field of Classification Search ................ 375/219, 375/221, 222, 278, 284, 285, 295, 296, 297, 375/316, 346, 220, 259; 455/63.1, 114.2, 455/278.1, 296
See application file for complete search history.

(56) References Cited

U.S. PATENT DOCUMENTS 5,691,978 A 11/1997 Kenworthy

| | | | |
|---|---|---|---|
| 6,263,017 B1 * | 7/2001 | Miller | ........................ 375/222 |
| 6,745,018 B1 | 6/2004 | Zehavi et al. | |
| 2003/0031279 A1 | 2/2003 | Blount et al. | |
| 2003/0161419 A1 | 8/2003 | Bach et al. | |
| 2004/0142700 A1 | 7/2004 | Marinier | |
| 2005/0190870 A1 * | 9/2005 | Blount et al. | ................ 375/346 |
| 2007/0297528 A1 * | 12/2007 | Feder et al. | ................. 375/267 |

FOREIGN PATENT DOCUMENTS

WO 01/54290 7/2001

* cited by examiner

*Primary Examiner*—Sam K Ahn
(74) *Attorney, Agent, or Firm*—Volpe and Koenig, P.C.

(57) ABSTRACT

A self-interference canceller (SIC) is incorporated into a transceiver to reduce or eliminate modem jamming when a transmitter in the transceiver transmits at high power levels. The SIC is configured to receive at a first input a transmitter noise reference signal including a self-interfering signal component generated by the transmitter, to receive at a second input a corrupted signal including the self-interfering signal component and a desired signal component generated by the transmitter, and to output a correction signal that resembles the self-interfering signal component. The correction signal is subtracted from the corrupted signal to generate a processed signal that is input to the modem. The SIC may be disabled when the output power of the transmitter is at a level below a predetermined threshold. The invention may be applied to a multi-radio access technology (RAT) transceiver.

11 Claims, 4 Drawing Sheets

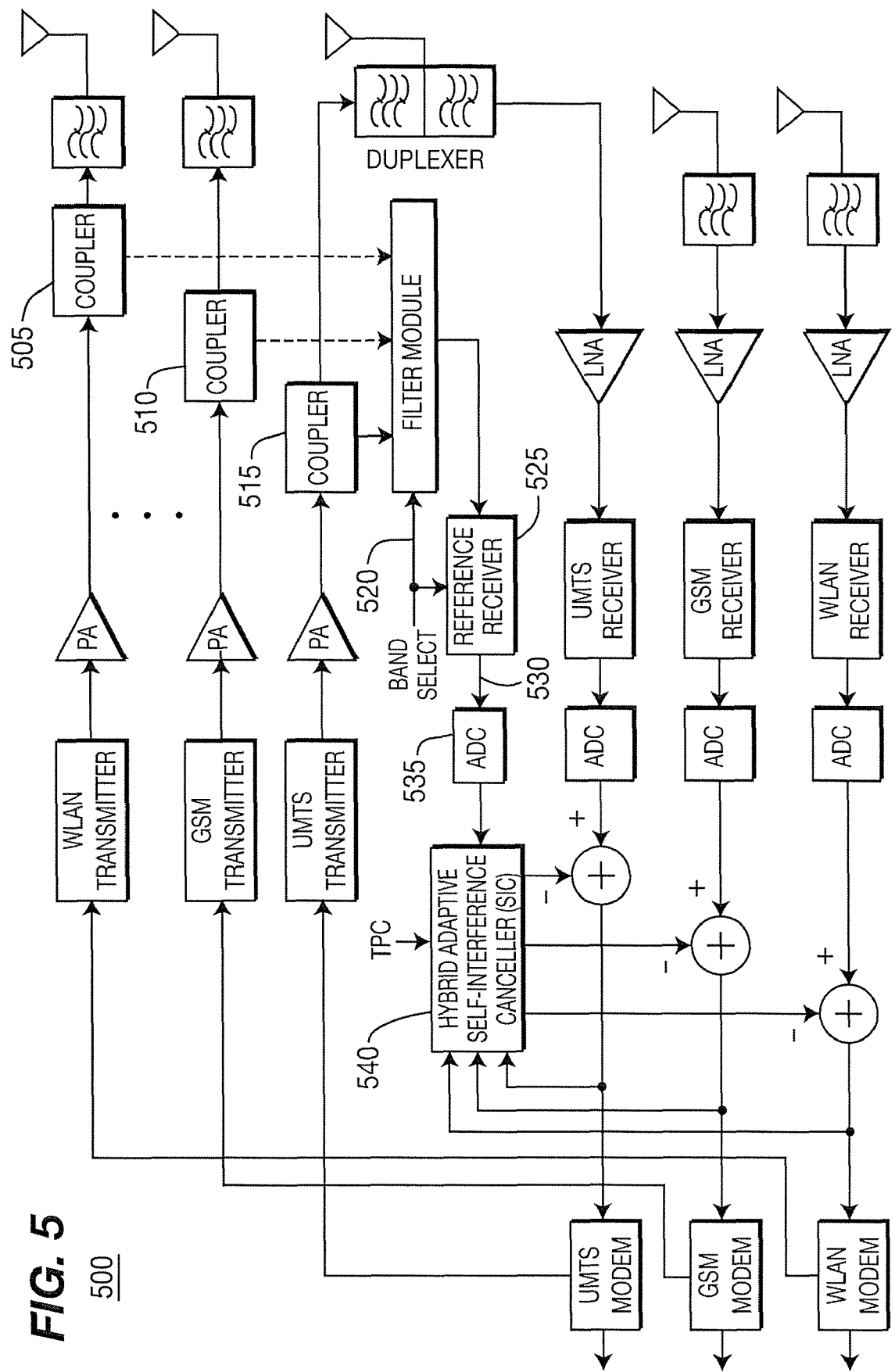

TRANSCEIVER WITH HYBRID ADAPTIVE SELF-INTERFERENCE CANCELLER FOR REMOVING TRANSMITTER GENERATED NOISE TO PREVENT MODEM JAMMING

CROSS REFERENCE TO RELATED APPLICATION

This application claims the benefit of U.S. Provisional Application No. 60/829,765 filed Oct. 17, 2006, which is incorporated by reference as if fully set forth.

FIELD OF INVENTION

The invention is related to wireless communication systems.

BACKGROUND

Current mobile technology trends integrate multiple radio access technologies (RATs) into a single wireless transmit/receive unit (WTRU) that transmits and receives via respective individual antennas, or via a common antenna that is shared through a duplexer filter. Particular specifications for RAT air interfaces are derived based on typical deployment scenarios. In the case of multiple RATs integrated into the same WTRU, self-interference can be significant, which results in receiver desensitization.

FIG. 1 shows an example of a problem that occurs in a conventional transceiver 100 including a transmitter 105, a power amplifier (PA) 110 and a modulator/demodulator (modem) 140, whereby noise generated by the transmitter 105 and the PA 110 causes the modem 140 to jam. The transceiver 100 may also include a duplexer 115, an antenna 120, a low noise amplifier (LNA) 125, a receiver 130 and an analog-to-digital converter (ADC) 135. The duplexer 115 may include a transmit filter 115A and a receive filter 115B. The transmitter 105 outputs a signal that is amplified by the PA 110 and is routed to the antenna 120 via the transmit filter 115A of the duplexer 115. Signals received by the antenna 120 are routed to the modem 140 via the receive filter 115B of the duplexer 115, the LNA 125, the receiver 130 and the ADC 135. The LNA 125 amplifies the received signals, the receiver downconverts the received signals to baseband signals, and the ADC 135 converts the baseband signals to digital signals that are input to the modem 140.

In the example shown in FIG. 1, the output noise density of the PA 115 is −120 dBm/Hz (@+24 dBm output in receive bands) and the duplexer 115 may provide about 40 dB of isolation to suppress the transmitter band noise. Thus, self-interference noise power from the transmitter 105 is −160 dBm/Hz, which is 7 dB above the noise floor of the receiver −167 dBm/Hz (−174 dBm/Hz, which is 50 Ohm noise density, plus 7 dB, which is the noise figure of a typical receiver)

It would be desirable to suppress the transmitter noise to the level, when the total combined noise of the receiver and the transmitter generated noise in receive band will not degrade the total noise figure (NF) by more than 1 dB. In the example of FIG. 1, It would be expected to see a combined noise at −166 dBm/Hz, which will limit the transmitter generated noise to:

$$-166 \text{ dBm/Hz} - (-167 \text{ dBm/Hz})$$
$$= 2.5e^{-17} \text{mW/Hz} - 2e - 17 \text{ mW/Hz}$$

-continued
$$= 0.5e^{-17} \text{mW/Hz}$$
$$= -173 \text{ dBm/Hz}.$$

Thus, it would be desirable to reduce the noise generated by the transmitter 105 by −160 dBm/Hz−(−173 dBm/Hz)=13 dB.

SUMMARY

A self-interference canceller (SIC) is incorporated into a transceiver to reduce or eliminate modem jamming when a transmitter in the transceiver transmits at high power levels. The SIC is configured to receive at a first input a transmitter noise reference signal including a self-interfering signal component generated by the transmitter, to receive at a second input a corrupted signal including the self-interfering signal component and a desired signal component generated by the transmitter, and to output a correction signal that resembles the self-interfering signal component. The correction signal is subtracted from the corrupted signal to generate a processed signal that is input to the modem. The SIC may be disabled when the output power of the transmitter is at a level below a predetermined threshold. The invention may be applied to a multi-RAT transceiver.

BRIEF DESCRIPTION OF THE DRAWINGS

The foregoing summary, as well as the following detailed description of the invention will be better understood when read with reference to the appended drawings, wherein:

FIG. 5 shows an example of a multi-RAT transceiver that uses an adaptive multi-mode hybrid adaptive SIC.

DETAILED DESCRIPTION

Hereafter, a wireless transmit/receive unit (WTRU) includes but is not limited to a user equipment (UE), mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

The invention provides mitigation of self-interference caused by out-of-band transmitter noise leaking into the receive pass-band in a transceiver, such as a WTRU or a base station. The invention implements a reference receiver to sample the transmitter RF signal in the receiver band of interest. Digital baseband processing is used to adaptively subtract the self-interfering signal from the receive signal path prior to baseband modem processing.

The invention reduces the self-interfering signal that leaks into the receiver pass-band of a transceiver via the finite physical isolation of the duplexer, and parasitic paths or spatially through antennas, if more than one antenna is used on a device. A sample of the transmitted signal is used as a reference to a hybrid adaptive SIC. The receive path consists of a desired signal component s(t) and a coherent self-interfering signal component I(t). The SIC adaptively updates an equalizer weight vector to reduce the interference level at the input of the modem of the transceiver to ensure minimum receiver desensitization.

Figure 1:
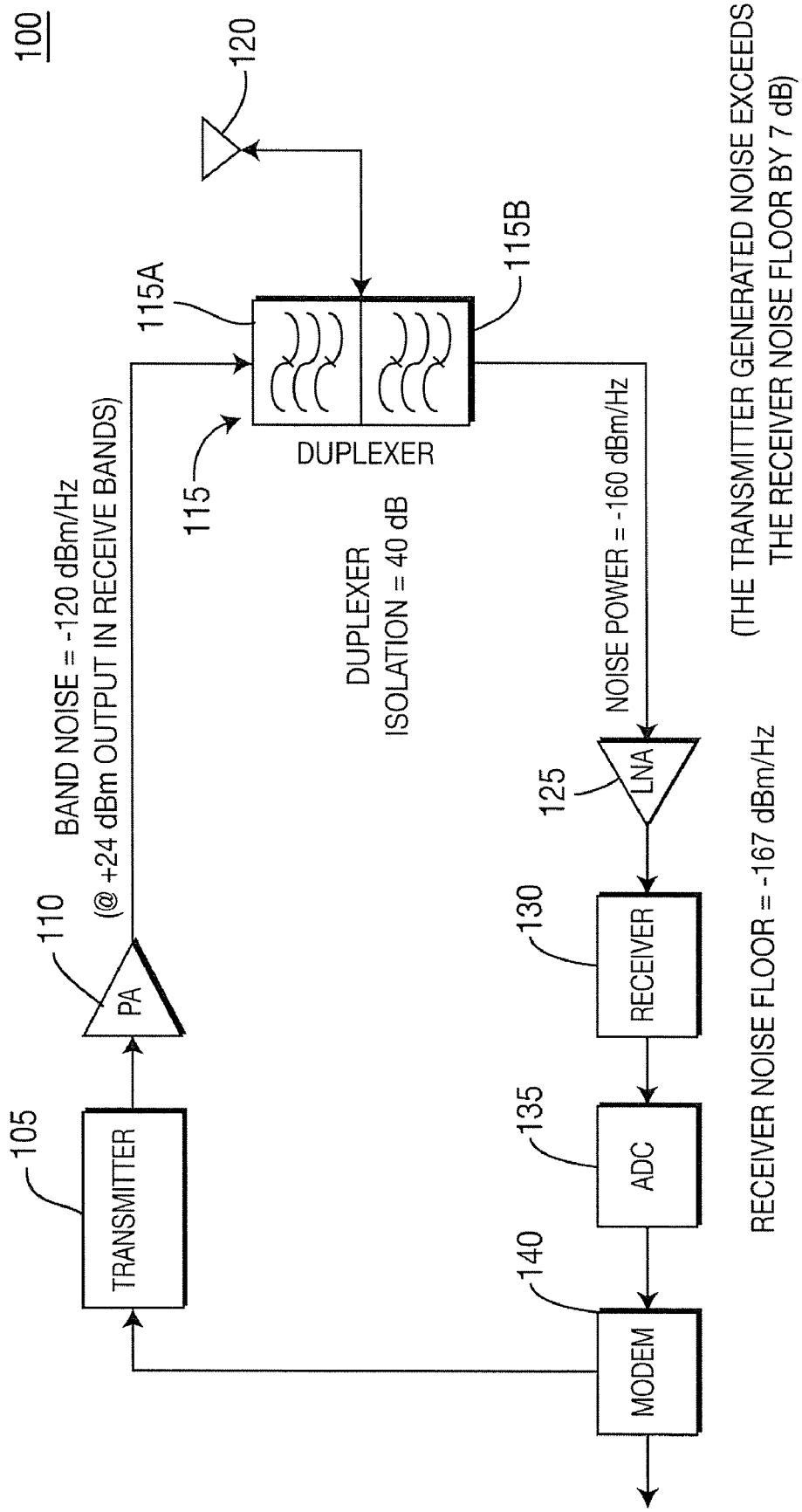
FIG. 1 shows an example of a conventional transceiver that experiences receiver jamming due to transmitter generated noise.
Figure 2:
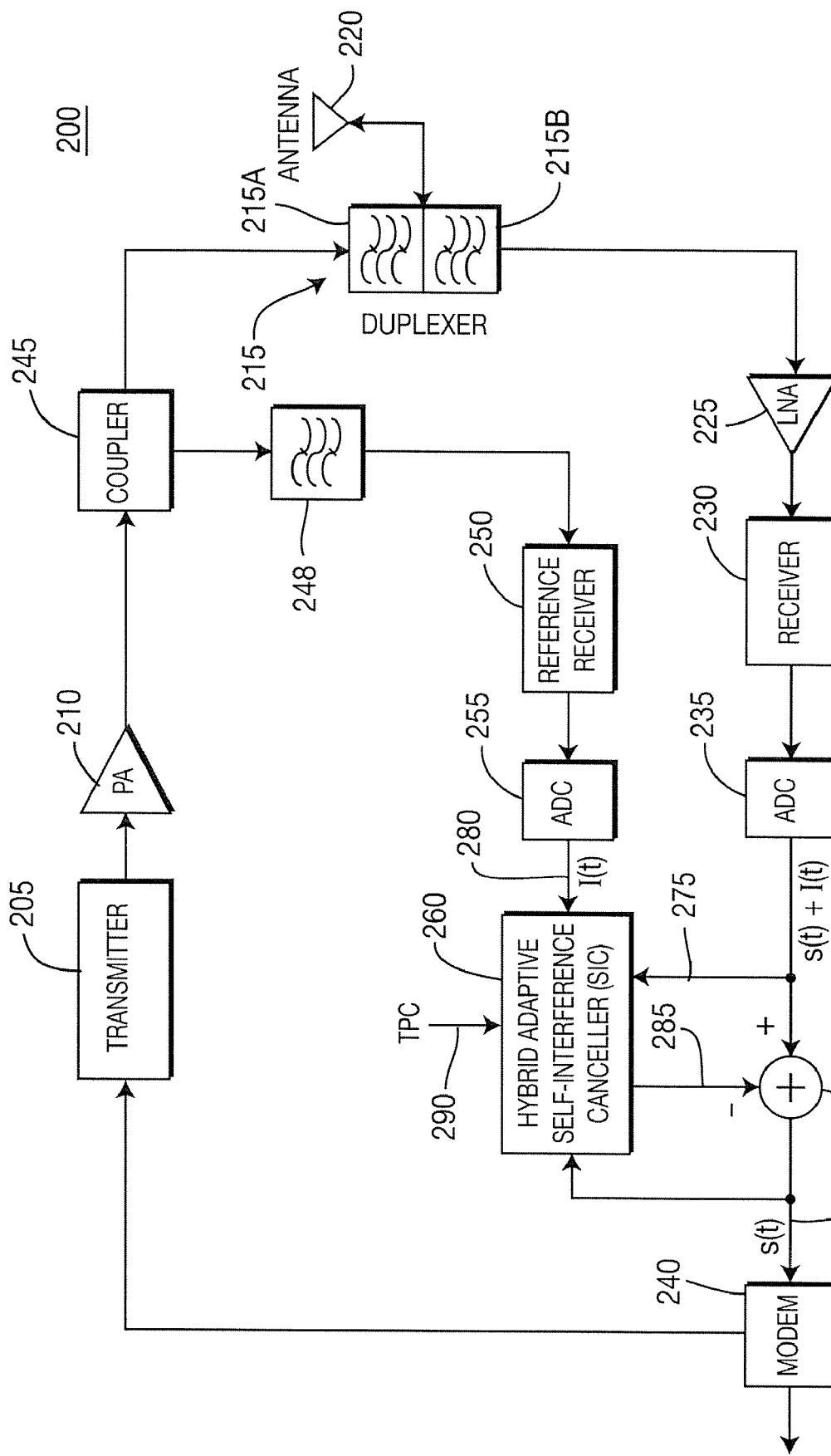
FIG. 2 shows an example of a transceiver including a hybrid adaptive SIC that prevents modem jamming.

FIG. 2 shows an example of a transceiver 200 that prevents the jamming of a modem 240 caused by a transmitter 205 and PA 210 in the transmit path of the transceiver 200. Noise generated by the transmitter 205 and PA 210 is reduced such that the noise does not jam a desired low power signal when it is close to the receiver noise floor. The transceiver 200 may be incorporated into a WTRU or a base station. Besides the transmitter 205 and the modem 240, the transceiver 200 may include a PA 210, a duplexer 215, an antenna 220, an LNA 225, a receiver 230, a first ADC 235, a coupler 245, a bandpass filter 248, a reference receiver 250, a second ADC 255, a hybrid adaptive SIC 260, and an adder 265. The adder may be incorporated into the hybrid adaptive SIC 260, or may be a separate component that is external to the hybrid adaptive SIC 260.

Referring to FIG. 2, the transmitter 205 outputs a signal that is amplified by the PA 210 and is routed to the antenna 220 via the coupler 245 and the transmit filter 215A of the duplexer 215. Signals received by the antenna 120 are amplified by the LNA 225, down-converted to a baseband signal via the receiver 230, converted to a digital signal 275 via the first ADC 235. An equalizer output signal, (i.e., correction signal), 285 is output by the hybrid adaptive SIC 260 and is subtracted from the digital signal 275 before being outputted to a modem 240. The noise in receive band at the PA 210 output is sampled by the coupler 245, filtered by the bandpass filter 248, down-converted to a baseband signal by the reference receiver 250, converted to a digital signal 280 via the second ADC 255 and then input to the hybrid adaptive SIC 260. The bandpass filter 248 rejects (i.e., attenuates) signals in the transmit band, and allows signals in the receive band to pass through with minimal loss.

The transceiver 200 of FIG. 2 may implement a hybrid least mean squared (LMS) correlation technique using the hybrid adaptive SIC 260. The transceiver 200 is capable of reducing the self-interfering signal component I(t) by 6 dB or more below the noise floor of the receiver 230, resulting in only a 1 dB of receiver desensitization that enables improved receiver performance, (e.g., an increased data rate). The hybrid adaptive SIC 260 prevents noise generated by the transmitter 205 from jamming the modem 240 by correlating a self-interfering signal component I(t) of the digital signal 280 with the digital signal 275, which includes a desired signal component s(t) that is corrupted by the self-interfering signal component I(t), (i.e., s(t)+I(t)). The adder 265 removes the self-interfering signal component I(t) from the digital signal 275 by subtracting an equalizer output signal, (i.e., correction signal), 285, which is generated by the hybrid adaptive SIC 260 to closely resemble the self-interfering signal component I(t), from the digital signal 275, resulting in a processed digital signal 270 that is output by the adder 265 to a modem 240.

Jamming of the modem 240 due to noise generated by the transmitter 205 only occurs at high power levels. Thus, there is no need for the hybrid adaptive SIC 260 to cancel noise generated by the transmitter 205 at low levels, because the noise is substantially below the noise floor of the receiver 230. For example, when the output power of the transmitter 205 is reduced, (e.g. by 15 dB), the sensitivity degradation of the receiver 230 becomes negligible and the hybrid adaptive SIC 260 may be disabled by a transmit power control (TPC) signal 290.

Figure 3:
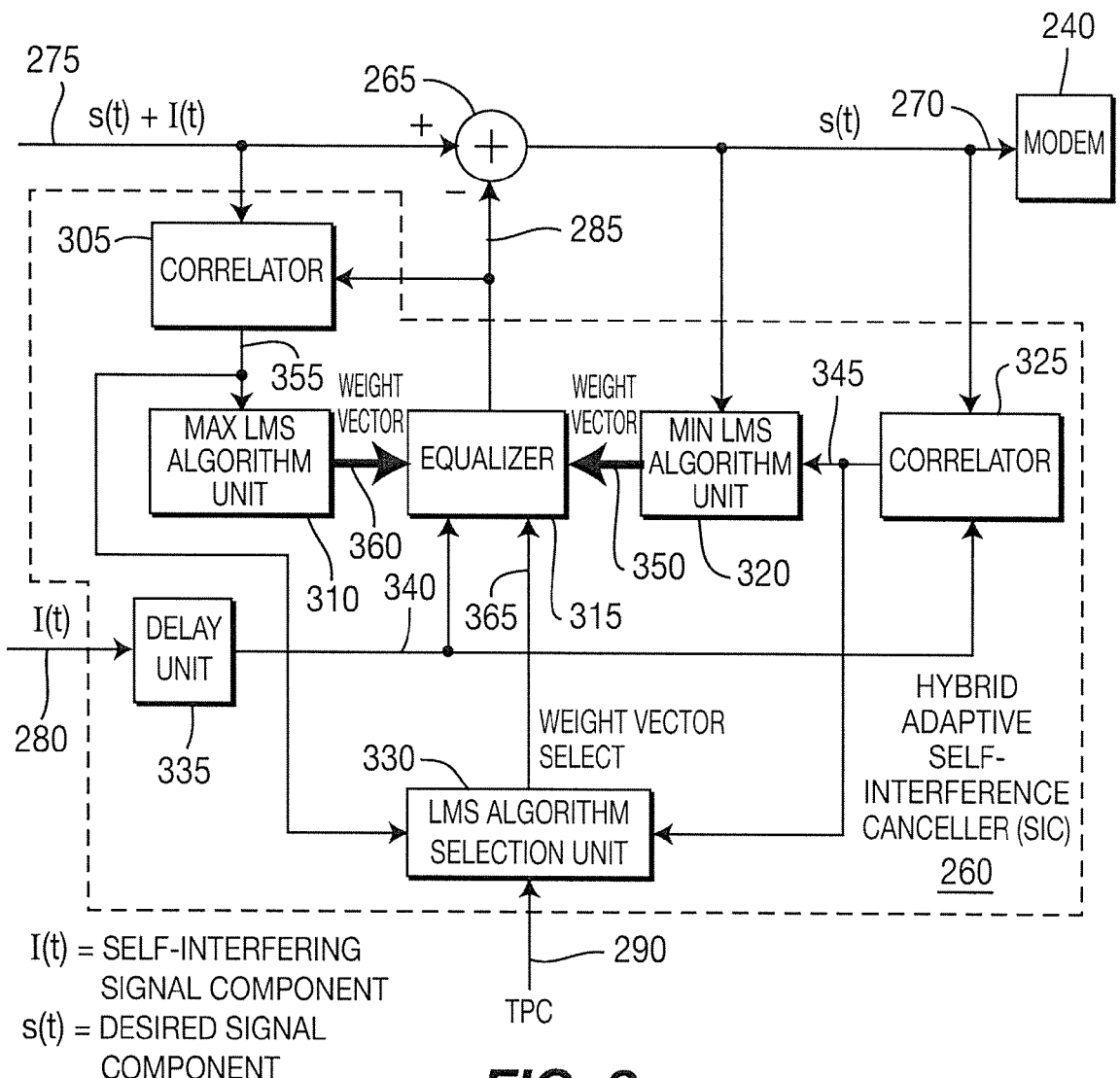
FIG. 3 shows an example of the configuration of the hybrid adaptive SIC used in the transceiver of FIG. 2.

FIG. 3 shows an example of a configuration of the hybrid adaptive SIC 260 used in the transceiver 200 of FIG. 2. The hybrid adaptive SIC 260 may include a first correlator 305, a maximum (max) LMS algorithm unit 310, an equalizer 315, a minimum (min) LMS algorithm unit 320, a second correlator 325, an LMS algorithm selection unit 330 and a delay unit 335.

As shown in the example of FIG. 3, the digital signal 280, which includes the self-interfering signal component I(t), is delayed by the delay unit 335 in order to time-align with the digital signal 275, which includes a desired signal component s(t) that is corrupted by the self-interfering signal component I(t), (i.e., s(t)+I(t)). A delayed digital noise sample signal 340 output by the delay 335 is fed into the equalizer 315, the first correlator 305 the second correlator 325.

The second correlator 325 outputs a correlation signal 345 to the min LMS algorithm unit 320 and the LMS algorithm selection unit 330 that indicates a value of the correlation, (e.g., signal-to-interference ratio (SIR)), between the processed digital signal 270 and the delayed digital noise sample signal 340. The min LMS algorithm unit 320 generates a weight vector 350 based on the processed digital signal 270 and the value of the correlation signal 345.

The first correlator 305 outputs a correlation signal 355 to the max LMS algorithm unit 320 and the LMS algorithm selection unit 330 that indicates the correlation between the processed digital signal 270 and the equalizer output signal 285. The max LMS algorithm unit 310 generates a weight vector 360 based on the value of the correlation signal 355.

At least one of the min LMS algorithm unit 320 and the max LMS algorithm unit 310 outputs a weight vector signal 350 or a weight vector signal 360, respectively, that adjusts, (i.e., dynamically weights), the output signal 285 generated by the equalizer 315 such that it closely resembles the self-interfering signal component I(t). The equalizer output signal 285 is then subtracted from the digital signal 275 with the goal of completely eliminating the self-interfering signal component I(t).

Based on the values of the correlation signals 345 and 355, the LMS algorithm selection unit 330 sends a weight vector select signal 365 to the equalizer 315 that determines whether to use the weight vector signal 360 from the max LMS algorithm unit 310, or the weight vector signal 350 from the min LMS algorithm unit 320. When the TPC signal 290 indicates that the power of the transmitter 205 is below a predetermined threshold, (e.g., between −10 dB to −20 dB), that would not cause the modem 240 to jam, the hybrid adaptive SIC 260 is disabled.

The performance of this method is limited when the level of the interfering signal component I(t) approaches the level of the desired signal component s(t). As a result, the minimum operating point of the min LMS algorithm unit 320 will remain close to the level of the desired signal component s(t), resulting in a 3 dB degradation in the performance of the transceiver 200.

Figure 4:
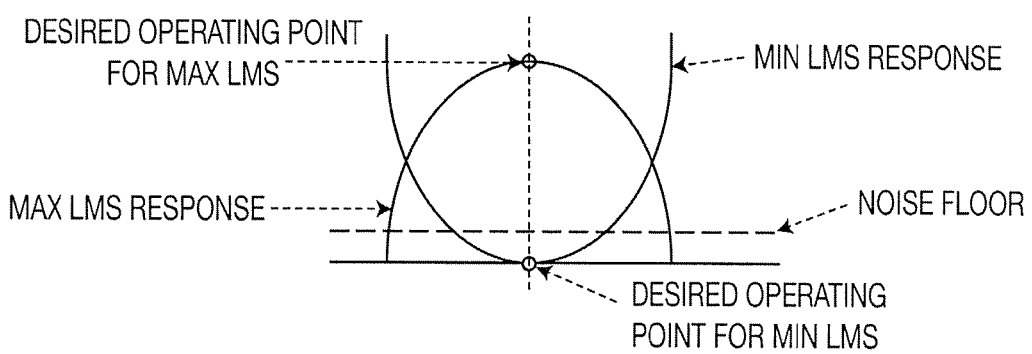
FIG. 4 is a graph that shows a hybrid cost error function.

The hybrid adaptive SIC 260 adaptively selects between different multiple cost function criteria to achieve the optimum cancellation response at both high and low SIR. FIG. 4 shows a hybrid cost "error" function. The min LMS cost function is illustrated by the convex function, and the max LMS function is illustrated by the concave function. The hybrid algorithm works by performing a joint optimization of both the min and max LMS cost functions. The optimization of the cost function is found by adapting the equalizer weights to achieve a minimum error at the output of the adder in the main signal path. The equalizer taps "$W_k$" are adjusted based on the gradient of the error signal $\nabla_{e(t)}$ and constant $\alpha$. The min LMS algorithm is described by Equation (1), and the max LMS algorithm is described by Equation (2).

$$\hat{W}_{k+1} = W_k - \alpha_k \cdot \nabla_{e(t)}, \text{ and} \qquad \text{Equation (1)}$$

$$\hat{W}_{k+1} = W_k + \alpha_k \cdot \nabla_{e(t)}; \qquad \text{Equation (2)}$$

where k is an index describing the kth equalizer tap.

The error prediction used to minimize each cost function is based on Equation (3) as follows:

$$e(n) = e(n) - \sum_{j=1}^{n} W_j(n) \cdot \nabla_{e(n-j)}. \qquad \text{Equation 3}$$

The min LMS algorithm initially searches for the desired operating point, but is limited by the dynamic noise and therefore cannot achieve this minimum bound. When this limit is achieved, the min LMS equalizer tap coefficients are fixed and the max LMS algorithm takes over to dynamically adjust the equalizer taps to achieve the desired max LMS operating point. The result is a cancellation of the self-interfering noise signal below the receiver noise floor enabling system performance comparable to that with no self-interfering signal.

The features of the hybrid adaptive SIC 260 described above can be extended to interface with multiple RATs. FIG. 5 shows an illustration of a multi-RAT transceiver 500. A respective coupler 605, 610, 615 is used at each transmitter output to obtain an RF sample from each interfering signal. A band select signal 520 is used to dynamically select and receive the band of interest and set the tuning of a reference receiver 525. The reference baseband signal 530 is digitized by an ADC 535 and adaptively processed in the same way as described above. The hybrid adaptive SIC 540 is extended to N identical implementations to support interference cancellation of N RATs (bands). In the proposed architecture, either a single interfering RAT may be processed individually, or multiple RATs may be processed via a dynamic rotation of equalization updates.

By way of example, the embodiments herein may be implemented in a WTRU, base station, wireless network controller, at the physical layer, in the form of an application specific integrated circuit (ASIC), hardware, or digital signal processor (DSP), in an orthogonal frequency division multiplexing (OFDM)/multiple-input multiple-output (MIMO), wideband code division multiple access (WCDMA), global system for mobile communications (GSM), or IEEE 802.11-based system. The invention is applicable to data cards including high-speed downlink packet access, smart antennas, cell phones, smart phones, feature phones, laptops, or any other personal communication device.

Although the features and elements are described in the embodiments in particular combinations, each feature or element can be used alone without the other features and elements of the embodiments or in various combinations with or without other features and elements of the invention. The methods or flow charts provided herein may be implemented in a computer program, software, or firmware tangibly embodied in a computer-readable storage medium for execution by a general purpose computer or a processor. Examples of computer-readable storage mediums include a random access memory (RAM), a register, cache memory, semiconductor memory devices, magnetic media such as internal hard disks and removable disks, magneto-optical media, and optical media, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
    a transmitter configured to generate a desired transmit signal on a transmit band which incidentally generates a self-interfering signal which corrupts a receive signal in a receive band, wherein the transmitter is transmitting and the receiver is receiving on different channels within the same radio access technologies (RATs);
    a receiver configured to receive the corrupted receive signal on at least one channel in the receive band;
    a self-interference canceller (SIC) configured to:
        receive a reference signal generated by filtering the desired transmit signal to pass the receive band and to attenuate the transmit band;
        receive the corrupted receive signal including the self-interfering signal from the receiver;
        filter and extract a correction signal that resembles the self-interfering signal; and
    subtract the correction signal from the corrupted receive signal to generate a desired receive signal.

2. The WTRU of claim 1 wherein the SIC further comprises:
    a delay unit configured to receive and delay the reference signal;
    a first correlator configured to correlate the delayed reference signal with the processed signal to generate a first correlation signal;
    an equalizer configured to receive the delayed reference signal and generate the correction signal;
    a minimum least mean square (LMS) algorithm unit configured to output a first weight vector signal to the equalizer based on the processed signal and the first correlation signal;
    a second correlator configured to correlate the corrupted receive signal with the correction signal to generate a second correlation signal;
    a maximum least mean square (LMS) algorithm unit configured to output a second weight vector signal to the equalizer based on the second correlation signal; and
    an LMS algorithm selection unit configured to input a weight select vector signal to the equalizer based on the first and second correlation signals to determine which of the first and second weight vector signals should be used by the equalizer to generate the correction signal.

3. The WTRU of claim 2 wherein the SIC is disabled on a condition that the transmit power of the transmitter falls below a predetermined threshold.

4. A wireless transmit/receive unit (WTRU) comprising:
a plurality of transmitters associated with the different radio access technologies (RATs), each of the transmitters generating desired transmit signals and incidentally generating cross RAT interfering signals that corrupt receive signals;
a plurality of receivers associated with the different RATs;
a self-interference canceller (SIC) configured to:
  receive a plurality of reference signals including the cross RAT interfering signals in receive bands;
  receive the corrupted receive signals from the receivers including respective self-interfering signal components and desired signal components; and
  filter and extract correction signals from the reference signals; and
a plurality of adders configured to subtract the correction signals from the corrupted receive signals to generate desired signals, wherein the transmitters are transmitting and the receivers are receiving on different channels.

5. A base station comprising:
a transmitter configured to generate a desired transmit signal which corrupts a receive signal, wherein the corrupted receive signal includes a self-interfering signal in a receive band, wherein the transmitter is transmitting and the receiver is receiving on different channels within the same radio access technologies (RATs);
a receiver configured to receive the corrupted receive signal;
a self-interference canceller (SIC) configured to:
  receive a reference signal from the transmitter including the self-interfering signal in the receive band;
  receive the corrupted receive signal from the receiver including the self-interfering signal and a desired receive signal;
  filter and extract a correction signal that resembles the self-interfering signal; and
an adder to subtract the correction signal from the corrupted receive signal to extract the desired receive signal.

6. The base station of claim 5 wherein the SIC further comprises:
a delay unit configured to receive and delay the reference signal;
a first correlator configured to correlate the delayed reference signal with the processed signal to generate a first correlation signal;
an equalizer configured to receive the delayed reference signal and generate the correction signal;
a minimum least mean square (LMS) algorithm unit configured to output a first weight vector signal to the equalizer based on the processed signal and the first correlation signal;
a second correlator configured to correlate the corrupted receive signal with the correction signal to generate a second correlation signal;
a maximum least mean square (LMS) algorithm unit configured to output a second weight vector signal to the equalizer based on the second correlation signal; and
an LMS algorithm selection unit configured to input a weight select vector signal to the equalizer based on the first and second correlation signals to determine which of the first and second weight vector signals should be used by the equalizer to generate the correction signals.

7. The base station of claim 6 wherein the SIC is disabled on a condition that the transmit power of the transmitter falls below a predetermined threshold.

8. A base station comprising:
a plurality of transmitters associated with the different RATs, each of the transmitters configured to generate transmit signals which produces a cross RAT interfering signal that corrupts receive signals;
a plurality of receivers associated with different RATs which receives the corrupted receive signals;
a self-interference canceller (SIC) configured to:
  receive a plurality of reference signals including the cross RAT interfering signal in receive bands;
  receive the corrupted receive signals from the plurality of receivers including the respective self-interfering signals;
  filter and extract a plurality of correction signals from the plurality of reference signals; and
a plurality of adders configured to subtract the correction signals from the respective corrupted receive signals to generate a plurality of desired receive signals, wherein the transmitters are transmitting and the receivers are receiving on different channels.

9. A self-interference canceller (SIC) for removing noise from a received signal, the noise generated by a transmitter, the SIC comprising:
a delay unit configured to receive and delay a reference signal;
an adder configured to receive a corrupted receive signal, output a processed signal by subtracting a correction signal from the corrupted signal;
a first correlator configured to correlate the delayed reference signal with the processed signal to generate a first correlation signal;
an equalizer configured to receive the delayed reference signal and generate the correction signal;
a minimum least mean square (LMS) algorithm unit configured to output a first weight vector signal to the equalizer based on the processed signal and the first correlation signal;
a second correlator configured to correlate the corrupted signal with the correction signal to generate a second correlation signal;
a maximum least mean square (LMS) algorithm unit configured to output a second weight vector signal to the equalizer based on the second correlation signal; and
an LMS algorithm selection unit that inputs a weight select vector signal to the equalizer based on the first and second correlation signals to determine which of the first and second weight vector signals should be used by the equalizer to generate the correction signal.

10. The SIC of claim 9 wherein the SIC is disabled on a condition that the transmit power of the transmitter falls below a predetermined threshold.

11. A method of removing a self-interfering signal generated by a transmitter, the method comprising:
receiving and delaying by a delay unit a transmitter noise reference signal including the self-interfering signal;
generating a correction signal by an equalizer based on the delayed transmitter noise reference signal;
receiving by a receiver a corrupted signal including the self-interfering signal and a desired signal;
subtracting the correction signal from the corrupted signal by an adder to generate a processed signal;

correlating the delayed transmitter noise reference signal by a first correlator with the processed signal to generate a first correlation signal;

generating a first weight vector signal by the equalizer based on the processed signal and the first correlation signal;

correlating the corrupted signal with the correction signal by a second correlator to generate a second correlation signal;

generating a second weight vector signal by the equalizer based on the second correlation signal; and determining which of the first and second weight vector signals should be used to generate the correction signal by an LMS algorithm selection unit.

* * * * *